No. 791,213. PATENTED MAY 30, 1905.
C. V. ROBERTS.
WATER FILTER.
APPLICATION FILED JUNE 26, 1903.
3 SHEETS—SHEET 1.
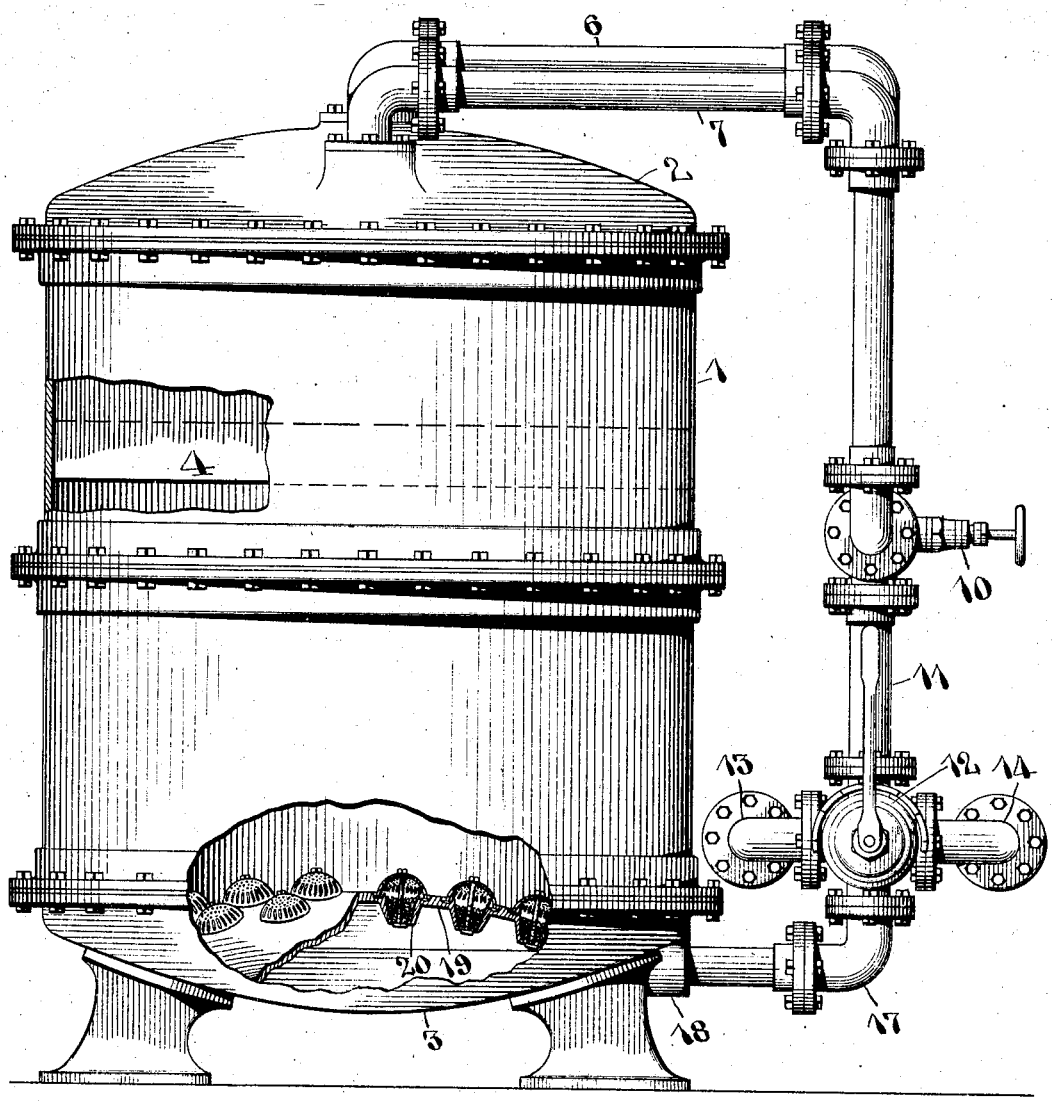
WITNESSES:
F. J. Hartman
Edw. W. Vaill Jr.
INVENTOR
Charles V. Roberts
BY
J. Mee Petty
ATTORNEY.

No. 791,213. PATENTED MAY 30, 1905.
C. V. ROBERTS.
WATER FILTER.
APPLICATION FILED JUNE 26, 1903.
3 SHEETS—SHEET 2.
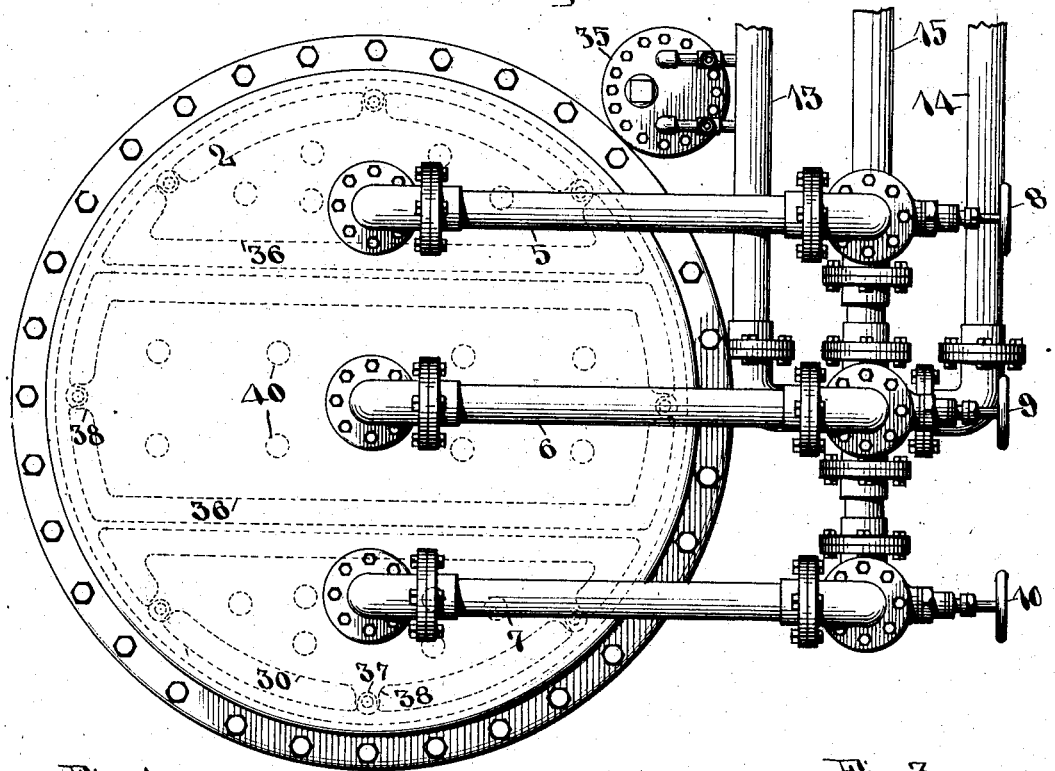
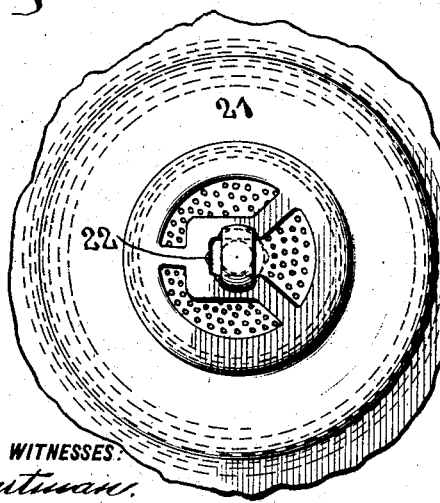
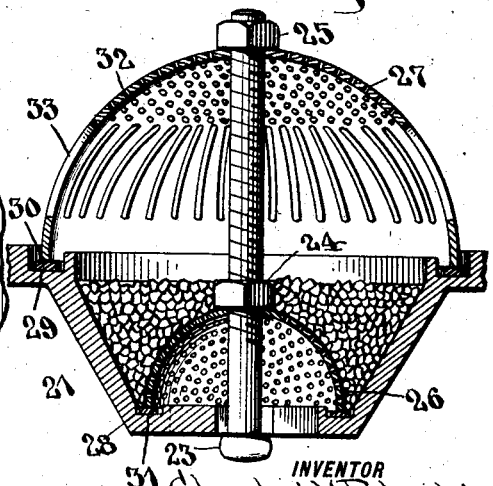

No. 791,213. PATENTED MAY 30, 1905.
C. V. ROBERTS.
WATER FILTER.
APPLICATION FILED JUNE 26, 1903.

3 SHEETS—SHEET 3.

WITNESSES:
F. J. Hartman
Edw. W. Vaul Jr.

INVENTOR
Charles V. Roberts.
BY
J. M. Petts
ATTORNEY.

No. 791,213. Patented May 30, 1905.

UNITED STATES PATENT OFFICE.

CHARLES V. ROBERTS, OF PHILADELPHIA, PENNSYLVANIA.

WATER-FILTER.

SPECIFICATION forming part of Letters Patent No. 791,213, dated May 30, 1905.

Application filed June 26, 1903. Serial No. 163,155.

*To all whom it may concern:*

Be it known that I, CHARLES V. ROBERTS, a citizen of the United States, and a resident of the city of Philadelphia, State of Pennsylvania, have invented certain new and useful Improvements in Filters, of which the following is a full, clear, and complete disclosure.

Broadly, my invention relates to those types of filters which are particularly adapted for use in dwelling-houses and other buildings and which require to be cleaned from time to time owing to the accumulation of sediment and other impurities from the water.

The principal object of my invention is to provide a filter which can be more effectively cleaned than heretofore possible and which possesses certain advantages of construction and arrangement of parts to be more fully and at length described, and the novel features thereof pointed out in the appended claims.

For a full, clear, and exact description of my invention reference may be had to the following specification and to the accompanying drawings, forming a part thereof, in which—

Figure 5:
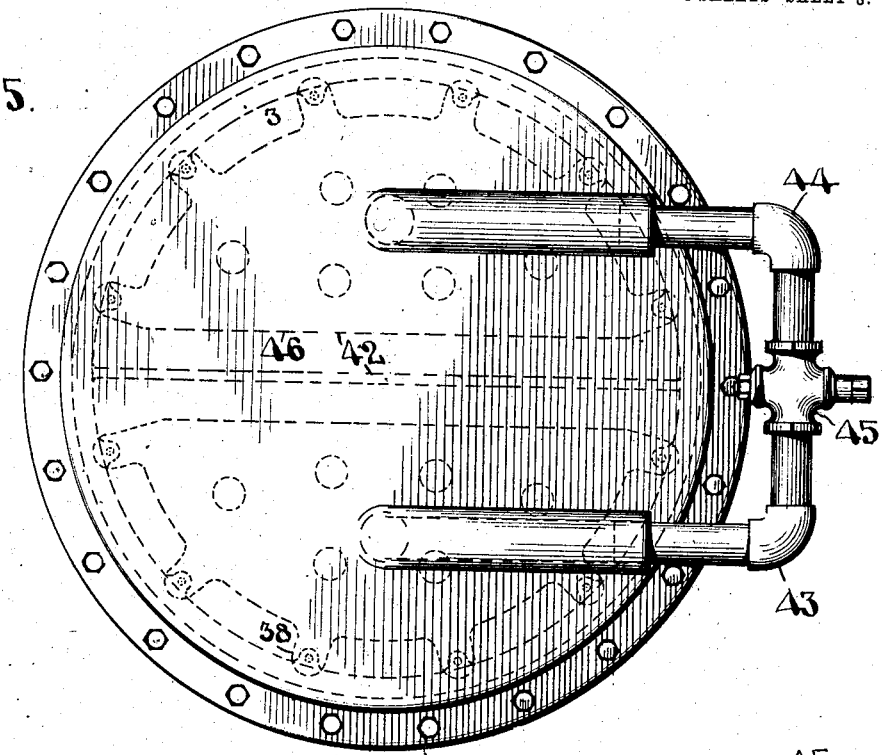
Figure 6:
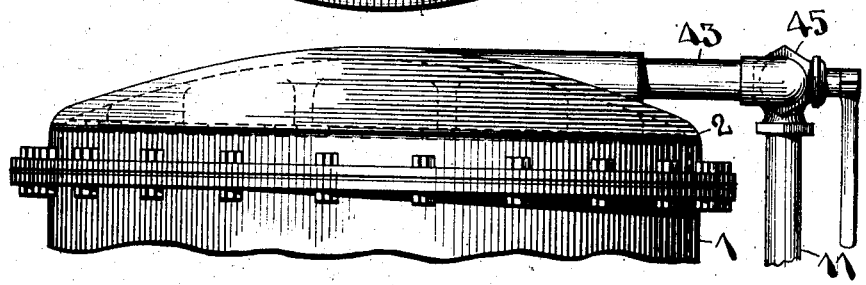
Figure 7:
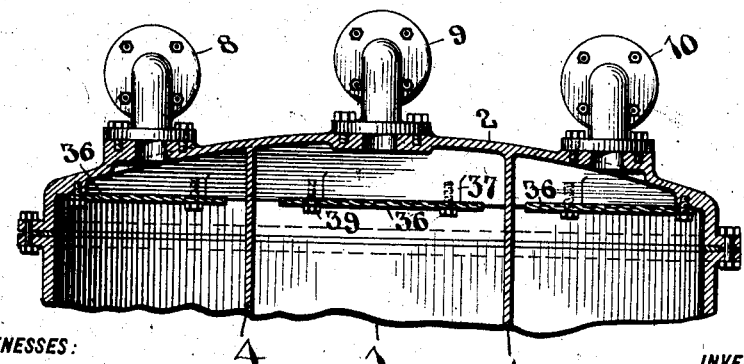

Figure 1 shows an elevation of my improved filter with said parts thereof broken away; Fig. 2, a plan view of the same; and Fig. 3, a longitudinal sectional view of one of the cups for preventing the filtering material from passing out of the bottom of the filter; Fig. 4, a bottom plan view of said cup; Fig. 5, a plan view of a modified form of filter; Fig. 6, an elevation of the upper portion thereof, and Fig. 7 a vertical central sectional view of the upper portion of the filter shown in Figs. 1 and 2.

Referring to the drawings, the numeral 1 indicates a casing, preferably cylindrical in form, which has attached to its upper and lower edges heads or plates 2 and 3. The upper head 2 has attached to its inner surface transverse plates 4, which are here shown as being two in number, but the number of plates may be varied to suit requirements, according to the size of the filter used and the flow of water available. These plates 4 extend downwardly from the head 2 into the interior of the cylindrical casing 1 for about a third of the height of the said casing to a point at or adjacent the surface of the filtering material, but preferably the lower ends of said plates 4 enter the filtering material for such a distance as to be completely buried in the same for a portion of their length, as indicated by the dotted line in Fig. 1.

Approximately at the centers of the divisions of the head 2, formed by the plates 4, are attached pipes 5, 6, and 7, which are adapted to serve as inlet or outlet pipes, according to whether the filter is being used for filtering purposes or is being cleaned. The pipes 5, 6, and 7 are provided with valves 8, 9, and 10, respectively, and after passing these valves said pipes unite into a common main 11, which leads to a universal controlling-valve 12. This controlling-valve 12 has connected to it the water-supply pipe 13 and an outlet or delivery pipe 14, which supplies the water to the points where it is to be used. A pipe 15 is also connected to said valve 12 and is adapted to carry off the waste water when the filter is being cleaned, but at other times is not in use. A pipe 17 also leads from the lower part of the valve 12 and enters the head 3 of the cylindrical casing, as indicated at 18. The valve 12 is so constructed that water may be made to flow from the pipe 13 to the pipe 11 and through the pipes 5, 6, and 7 into the filter, while at the same time the water flows out through the head 3 into the pipe 17 and into the outlet or delivery pipe 14, from which it is supplied to the different parts of the house or other building. This is the normal working condition for filtering purposes.

Connected with the lower head 3 is a secondary head or diaphragm 19, which has openings 20 therein over its entire area to permit the passage of the water, which are provided with means for preventing the filtering material from escaping. For the purpose of preventing the filtering material from passing through these openings I provide the construction particularly shown in Figs. 3 and 4 in detail. The secondary head 19 is provided with a series of inverted-frustum-shaped receptacles or sockets 21, which are open at their tops or larger ends and at their lower or smaller ends are provided with openings, which form a slotted or notched web, as indicated at 22. A T-headed bolt 23 is adapted to be retained in the slot of the web, so as to be capable of removal when the parts are disassembled. Said T-headed bolt carries nuts 24 and 25, which are adapted to retain two hemispherical cups 26 and 27 in position. The edges of these cups 26 and 27 fit into grooves 28 and 29, which are provided, respectively, therefor adjacent the ends of the inclined portion of the sockets 21. Packing-rings 30 and 31 may be employed to give the edges of the cups 26 and 27 a good contact within the grooves 28 and 29. The upper or larger cup 27 is preferably constructed as shown, being foraminous or provided for a part of its surface with small holes 32, while the portion adjacent the base of the cup is provided with narrow slots 33, the purpose of which will be more fully described. The cup 26 is preferably merely provided with small holes; but I may also use the slots in this cup should the same be deemed advantageous. The space between the inclined sides of the socket 21 and the interior of the cup 26 is filled with coarse gravel of such a size that it will not pass through the openings in the cup and yet will be capable of preventing the filtering-sand from passing through said cups and socket.

In the upper part of the filter-chambers I provide baffle-plates 36, which are located below the end of the pipes 5, 6, and 7, so as to distribute the water flowing in either direction during the filtering and cleaning operations. These baffle-plates are attached to lugs 37, carried upon the interior of the filtering-chamber, and engage lugs 38, carried by said baffle-plates, to which they are secured by screws 39. The baffle-plates 36 are provided with holes 40, which are distributed over the surface of said plates in such a manner as to regulate the flow of the water through the surface of the sand, so as to concentrate said flow more or less at the walls of the compartment formed by the plates 4. This regulation of the flow is rendered desirable from the fact that the water in flowing through the sand takes the shortest path from the inlet to the outlet, and to make this flow even and uniform throughout the whole body of the sand the baffle-plates are required.

In the form shown in Fig. 5 I have provided only two compartments within the filter-chamber, which are separated by the plate 42. I have also provided corresponding pipes 43 and 44, which are connected with the pipe 11 from the main controlling-valve 12 by means of a three-way valve 45. This valve 45 takes the place of the single valves 8, 9, and 10 in the construction where three or more compartments are provided in the upper part of the filter-chamber. In this form I also provide baffle-plates 46, which are attached to the interior of the chambers in the same way. In operation the valve 45 may be made to cause the pipe 11 to communicate with either or both of the pipes 43 and 44 or may be made to shut off all communication with said pipes. In the filtering operation the water is made to enter the filter-chamber through both pipes 43 and 44, while during the cleaning operation the water is made to flow in the reverse direction successively through one of said pipes and then the other.

The form of the filter illustrated in Figs. 5 and 6 is of course also provided with the lower head 3, secondary head or diaphragm 19 having the sockets and cups for retaining the gravel in the openings 20.

A tank 35 for supplying alum in solution to the water-feed pipe 13 may be used when extra means is required for settling the water.

The normal working conditions of my device have already been described; but in addition it may be stated that the water passes downwardly through the cups and sockets just described without carrying with it any of the filtering-sand and without retarding the flow of water to any great extent because of the coarse gravel and foraminous partitions.

One of the principal advantages of my improved filter resides in the manner in which the same may be cleaned. This is accomplished by turning the handle of the valve 12 into such a position that the direction of the water in passing through the cylindrical casing 1 will be reversed in its flow and instead of passing out through the outlet-pipe 14 will pass out through the waste-pipe 15. At the same time any two of the valves 8, 9, and 10 may be closed, thereby confining the passage of the water from the filter-chamber to any one of the pipes 5, 6, or 7.

It will be supposed that the valves 9 and 10 have been closed and that the passage of the water from the filter-chamber is confined to the pipe 5. The water then enters from the supply-pipe 13, passing through the valve 12 to the pipe 17, from which it passes into the space below the secondary head 19 and thence into the filter-chamber. In passing into the filter-chamber the water is divided into jets by the holes 32 in the upper part of the hemispherical cups 27; but the slots 33 divide the water into elongated streams or jets which have a very efficient knife-edge or cutting action upon the particles of filtering material immediately adjacent, and thereby thoroughly stirs up and separates said particles, so that the filtering material is more or less loosened throughout its entire body. It is obvious that the openings in said cups may consist entirely of elongated slots similar to those shown at 33. In its passage through the filter-chamber the water converges in its flow toward one compartment formed by the partition or plate 4 and into which the pipe 5 passes. It will thus be seen that the entire flow of the water is concentrated toward said compartment and the surface of the sand and its layers for several inches downward are agitated to a very high degree, thereby loosening all the impurities and solid matter which have become lodged there owing to the opposite flow of the water when the filtering operation is being utilized. The sand is thus thoroughly cleansed at the point where the same is needed to the greatest extent and by a flow of water which is as much greater than that available without the division-plates 4 in the proportion that the number of compartments is greater than one. After each one of the compartments has been alternately treated in this manner by successively closing different pairs of the valves 8, 9, and 10 the valve 12 is so turned as to allow the water to pass through the filter in the normal direction, but instead of going through the supply-pipe 14 to the points of consumption is allowed to run to waste through the pipe 15, thus permitting the filter to become settled and to be put into good working order before the water is turned into the house-mains. The handle of the valve 12 is then turned into its normal position, so that the water after leaving the filter passes through the pipe 14 instead of the pipe 15, thus leaving the apparatus in its normal condition for use. The valve 12 may also be manipulated to cut out the filter and turn the unfiltered water directly into the house-mains or the water-supply may be entirely cut off both from the filter and the house. The features of construction of the valve 12 for accomplishing these operations and connections by a simple turning of the valve-handle into different positions successively I do not claim in this application, as the same is the subject of a separate application, Serial No. 163,156; nor is the particular use of this form of valve 12 essential in this device, as any form and arrangement of valve or valves may be used which will control the flow of water in the right directions and at the right time.

It is obvious that my improved filter may be used in connection with other fluids beside water wherever it is desired to cleanse the filtering material from time to time without removing the same from the filter.

I do not wish to be limited to the exact details of form and arrangement of parts herein set forth, for changes may be made and different equivalents may be used without departing from the spirit and scope of my invention.

I do not wish to be limited to exact form of the compartments for dividing the upper portions of the filtering material into sections, for the same may be made circular, rectangular, or sector-shape to the same effect and for the production of the same functions.

Having thus described my invention, what I claim, and desire to protect by Letters Patent of the United States, is—

1. A filter, comprising a filter-chamber, means for conducting fluid to and from said filter-chamber, filtering material in said chamber and means for confining the flow of fluid through definite segregated portions of the upper portion of said filtering material but at the same time allowing the fluid to pass through substantially the entire body of said filtering material.

2. A filter, comprising a filter-chamber, means for conducting fluid to and from said filter-chamber, filtering material in said chamber, means for admitting fluid over substantially the entire bottom of said chamber and means for confining the flow of fluid through definite segregated portions of the surface of said filtering material.

3. A filter, comprising a filter-chamber, means for conducting fluid to and from said chamber, filtering material in said chamber, a series of openings over substantially the whole of the bottom of said chamber and means for confining the flow of fluid through definite segregated portions of the surface of said filtering material.

4. A filter, comprising a filter-chamber, means for conducting the fluid to and from said filter-chamber, filtering material in said chamber, means for admitting fluid over substantially the entire bottom of said chamber and compartments in the upper part of said chamber the dividing-walls of which extend to the surface of the filtering material in the filter-chamber.

5. A filter, comprising a filter-chamber, means for conducting fluid to and from said filter-chamber, filtering material in said chamber, means for admitting fluid over substantially the entire bottom of said chamber and compartments in the upper part of said chamber the dividing-walls of which extend downwardly from the top of said chamber to a point adjacent the surface of the filtering material in the filter-chamber.

6. A filter, comprising a filter-chamber, means for conducting fluid to and from said chamber, filtering material in said chamber, means for admitting fluid over substantially the entire bottom of said chamber and compartments the dividing-walls of which extend for a short distance below the surface of the filter material in the filtering-chamber.

7. A filter, comprising a filter-chamber, filtering material in said chamber, openings covering substantially the entire bottom of said chamber, means for conducting fluid through said openings, compartments the dividing-walls of which extend for a short distance below the surface of the filtering material and means for conducting fluid away from any one of said compartments.

8. A filter, comprising a filter-chamber, filtering material in said chamber, a series of openings over the entire bottom of said chamber, vertical dividing-walls extending from the top of said chamber to points a short distance below the surface of the filtering material and valved pipes connected with each of the compartments formed by said dividing-walls.

9. A filter comprising a filter-chamber, filtering material in said chamber, a series of openings over the entire bottom of said chamber, means in connection with said openings for preventing the filtering material from passing therethrough, means for supplying fluid to said openings, vertical dividing-walls extending from the top of said chamber to a point a short distance below the surface of the filtering material, a pipe having valved branches connecting with each of the compartments formed by the dividing-walls.

10. A filter comprising a filter-chamber, filtering material in said chamber, a series of openings over the entire bottom of said chamber, means in connection with said openings for preventing the filtering material from passing therethrough, a pipe for supplying fluid to said openings or for withdrawing water therefrom, vertical dividing-walls extending from the top of said chamber to a point a short distance below the surface of the filtering material, a pipe having valved branches connecting with each of the compartments formed by the dividing-walls and a main valve communicating with both of the above-named pipes for passing fluid therethrough in either direction.

11. A filter comprising a filter-chamber, filtering material in said chamber, a series of openings over the entire bottom of said chamber, means in connection with said openings for preventing the filtering material from passing therethrough, a pipe for supplying fluid to said openings or for withdrawing fluid therefrom, vertical dividing-walls extending from the top of said chamber to a point a short distance below the surface of the filtering material, a pipe having valved branches connecting with each of the compartments formed by the dividing-walls, a main valve communicating with both of the above-named pipes for passing fluid therethrough in either direction, a fluid-supply pipe, a pure-fluid-delivery pipe and a waste-pipe, said last-named three pipes being also connected to said main valve.

12. In a filter, means for allowing the passage of fluid, but preventing the passage of filtering material, comprising a plate having depressed open-ended sockets therein, arching covers for said sockets, having openings of small dimensions therein, means for retaining granular material within said sockets, and a single fastening device passing through said cover and said last-named means, for holding the same in position, in relation to said sockets.

13. In a filter, means for allowing the passage of fluid, but preventing the passage of filtering material, comprising open-ended sockets, arched foraminous covers for said sockets, foraminous partitions for preventing granular material from passing through the openings in said sockets, said plates and sockets having grooves to receive the edges of said covers and said partitions, and a single fastening device passing through said parts, and engaging said sockets for holding said parts in position.

14. In a filter, means for allowing the passage of fluid, but for preventing the passage of filtering material comprising depressed open-ended sockets, means for preventing the granular material from passing through the openings in said sockets, and an arched cover for said sockets having slits or elongated openings therein.

15. In a filter, means for allowing the passage of fluid but preventing the passage of filtering material comprising an open-ended socket, a foraminous arched cover also having slits or elongated openings therein, an arched foraminous partition for preventing the granular material from passing through the opening in said socket.

16. In a filter, means for allowing the passage of fluid but for preventing the passage of filtering material, comprising open-ended sockets, an arched foraminous cover for said socket having slits or elongated openings therein, an arched foraminous partition for preventing the granular material from passing through the opening in said sockets, a web having a slot therein located in said opening, and a T-bolt removably held in said slot for holding said cover and partition in position.

17. A filter consisting of a casing having a vertical partition extending across its upper portion and containing filtering material, a supply-pipe having branches of which one enters the upper part of the casing on each side of the partition, and a delivery-pipe connected to the bottom of the casing, substantially as described.

18. A filter-casing having a partition extending across its lower portion, said partition being provided with a series of openings of which each is surrounded by an annular groove, a perforated cover of curved material for each opening having its edges extending into said groove and formed convex with the partition, with means for holding the cover in position, said casing containing filtering material, and being provided with openings for the entrance and exit of fluid treated, substantially as described.

19. In a filter, the combination of a casing, containing filtering material, a partition extending vertically across the upper portion of the casing, a substantially horizontal partition extending across the lower portion and provided with an opening or a series of openings for the passage of liquid and a system of piping connected to a source of supply and to a distributing system, with connections from said piping into the upper portion of the casing on each side of the vertical partition and a connection entering the filter-casing below the horizontal partition, with valves for controlling the flow of fluid, substantially as described.

20. The combination of a filter-casing having a vertical partition dividing its upper portion into two separate chambers, a horizontal partition extending across the lower portion of the casing, a pipe connected to a source of water-supply and having branches entering the upper part of the casing on both sides of the vertical partition, and a delivery-pipe connected to the space below the horizontal partition, said horizontal partition having openings through it and being constructed to support a body of filtering material, substantially as described.

21. The combination of a filter-casing having a vertical partition dividing its upper portion into two separate chambers, a horizontal partition extending across the lower portion of the casing, a pipe connected to a source of supply and having branches entering the upper part of the casing on both sides of the vertical partition, and a delivery-pipe connected to the space below the horizontal partition, said horizontal partition having openings through it and being constructed to support a body of filtering material, and a pipe extending between the supply-pipe and the delivery-pipe with a valve in said connecting-pipe, substantially as described.

22. A filter-casing having a vertical partition extending across its upper part, filtering material in the casing a pipe connected to a source of water-supply having branches entering the casing on each side of said partition, a delivery-pipe entering the bottom of the casing, a pipe extending between the supply-pipe and the delivery-pipe and a second pipe in connection with the two branch pipes and connected to the delivery-pipe and to a waste-pipe, with valves for controlling the flow of fluid through said pipes, substantially as described.

23. A filter-casing having a vertical partition extending across its upper part, filtering material in the casing a pipe connected to a source of supply having branches entering the casing on both sides of the partition, a delivery-pipe connection to the bottom of the casing, a pipe extending between the supply-pipe and the delivery-pipe, a pipe connecting the delivery-pipe with a waste-pipe, a valve in each of the branch pipes, a valve in the pipe connecting the supply-pipe with the delivery-pipe, and a valve in the delivery-pipe, substantially as described.

In witness whereof I have hereunto set my hand this 24th day of June, A. D. 1903.

CHARLES V. ROBERTS.

Witnesses:
    LEWIS H. VAN DUSEN,
    EDW. W. VAILL, Jr.